US007237989B2

United States Patent
Glaesser

(10) Patent No.: US 7,237,989 B2
(45) Date of Patent: Jul. 3, 2007

(54) MILLING METHOD USED FOR PRODUCING STRUCTURAL COMPONENTS

(75) Inventor: Arndt Glaesser, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/560,549

(22) PCT Filed: Jun. 11, 2004

(86) PCT No.: PCT/DE2004/001212

§ 371 (c)(1),
(2), (4) Date: Dec. 12, 2005

(87) PCT Pub. No.: WO2004/113000

PCT Pub. Date: Dec. 29, 2004

(65) Prior Publication Data

US 2006/0140734 A1 Jun. 29, 2006

(30) Foreign Application Priority Data

Jun. 19, 2003 (DE) .................... 103 27 623

(51) Int. Cl.
*B23C 3/18* (2006.01)
*B23C 3/04* (2006.01)
*G05B 19/19* (2006.01)

(52) U.S. Cl. .................. 409/132; 409/80; 409/84; 409/120; 409/167; 409/199; 29/888.7; 700/187; 700/190

(58) Field of Classification Search ........... 409/132, 409/131, 84, 119, 120, 199, 166, 167, 79, 409/80, 165; 29/889, 889.23, 889.6, 889.7, 29/27 C, 557, 558, 889.2; 700/190, 187

See application file for complete search history.

(56) References Cited

U.S. PATENT DOCUMENTS

| | | | | | |
|---|---|---|---|---|---|
| 2,826,123 | A | * | 3/1958 | Leverington | 409/290 |
| 3,127,506 | A | * | 3/1964 | Fayard | 409/80 |
| 3,757,474 | A | * | 9/1973 | Pedersen | 451/123 |
| 3,808,944 | A | * | 5/1974 | Braginetz | 409/199 |
| 3,823,626 | A | * | 7/1974 | Bakewell | 82/1.11 |
| 3,874,268 | A | * | 4/1975 | Huf | 451/212 |
| 3,941,524 | A | * | 3/1976 | Huf | 418/99 |
| 4,031,809 | A | * | 6/1977 | Shraiman et al. | 409/84 |
| 4,176,992 | A | * | 12/1979 | Ross et al. | 409/131 |
| 4,521,860 | A | * | 6/1985 | Kanematsu et al. | 700/184 |
| 4,527,967 | A | * | 7/1985 | Ingalls | 418/150 |
| 4,747,236 | A | * | 5/1988 | Wedeniwski | 409/132 |

(Continued)

FOREIGN PATENT DOCUMENTS

| DE | 102 19 012 A1 | 11/2003 |
|---|---|---|
| EP | 1 034 865 A1 | 9/2000 |
| EP | 1 356 886 A1 | 10/2003 |

*Primary Examiner*—Dana Ross
(74) *Attorney, Agent, or Firm*—W. F. Fasse; W. G. Fasse

(57) ABSTRACT

A milling method is for producing milled structural components of materials that are difficult to machine by chip-cutting. A milling tool with a tool radius is rotationally driven about an axis of the milling tool to ensure a central rotation thereof, whereby a reference point of the milling tool preferably lying on the axis is moved on several curved paths, whereby the paths preferably comprise different curvatures, and whereby the milling tool is moved on the paths with a radial miller feed relative to the material. The curvature at each path point of each path is determined in such a manner that an optimized or maximized circumferential contact of the milling tool is ensured for each path point.

13 Claims, 3 Drawing Sheets

U.S. PATENT DOCUMENTS

| | | | | |
|---|---|---|---|---|
| 4,949,270 A * | 8/1990 | Shima et al. | ................ | 700/184 |
| 4,955,163 A * | 9/1990 | Sommer | ....................... | 451/47 |
| 5,125,775 A * | 6/1992 | Breuer et al. | ................ | 409/132 |
| 5,200,677 A * | 4/1993 | Dueck et al. | ................ | 318/567 |
| 5,378,091 A * | 1/1995 | Nakamura | .................. | 409/132 |
| 5,595,463 A * | 1/1997 | Takegahara et al. | ......... | 409/132 |
| 5,733,080 A * | 3/1998 | David et al. | ................. | 409/132 |
| 5,919,012 A * | 7/1999 | Nakagawa et al. | ......... | 409/132 |
| 6,089,799 A * | 7/2000 | Momochi et al. | .......... | 409/132 |
| 6,155,757 A * | 12/2000 | Neumann | .................... | 409/131 |
| 6,357,977 B1 * | 3/2002 | Momochi et al. | ........... | 409/132 |
| 6,390,740 B1 * | 5/2002 | Nesbitt et al. | ............... | 409/132 |
| 6,485,236 B1 * | 11/2002 | Engeli et al. | ................ | 409/132 |
| 6,491,482 B1 | 12/2002 | Fenkl et al. | | |
| 6,536,313 B1 * | 3/2003 | Bent et al. | .................... | 82/1.11 |
| 6,591,158 B1 * | 7/2003 | Bieterman et al. | .......... | 700/187 |
| 6,604,015 B2 * | 8/2003 | Iriguchi et al. | ............. | 700/187 |
| 6,632,053 B2 * | 10/2003 | Koch | ......................... | 409/132 |
| 6,732,910 B2 * | 5/2004 | Benedetti et al. | ........... | 29/889.7 |
| 6,824,336 B2 * | 11/2004 | Izutsu et al. | ................. | 409/132 |
| 6,832,876 B2 * | 12/2004 | Hobbs | ........................ | 409/132 |
| 6,869,259 B2 | 3/2005 | Lebkuechner | | |
| 6,901,310 B2 * | 5/2005 | Kobbelt et al. | .............. | 700/187 |
| 6,902,360 B2 * | 6/2005 | Meece et al. | ................ | 409/132 |

\* cited by examiner

MILLING METHOD USED FOR PRODUCING STRUCTURAL COMPONENTS

FIELD OF THE INVENTION

The invention relates to a milling method for the production of milled structural components.

BACKGROUND INFORMATION

The present invention relates to the field of milling technology, especially the HSC milling (High Speed Cutting milling), which is also designated as HPC milling (High Performance Cutting milling), and namely the case of the so-called trochoidal milling.

In so-called trochoidal milling, a milling tool or a miller, which comprises a certain tool radius, is rotationally driven about an axis of the miller to ensure a central rotation of the miller. A reference point of the miller, which preferably lies on the axis, is moved on a curved path or track simultaneously to the milling processing or machining, whereby this path is circular in shape according to the prior art in conventional trochoidal milling. A translational feed advance motion of the reference point is superimposed on the motion of the milling tool or of the miller along this path. The superposition of these three motions of the milling tool, i.e. the superposition of the central rotation of the milling tool about its axis, with the motion of the reference point of the milling tool on a circular path, and with the translational feed advance motion of the reference point of the milling tool, results in a motion of the milling tool in the sense of a trochoid or cycloid.

For a stable milling process in the trochoidal milling it is significant that the maximum permissible cutting forces on the milling tool are not exceeded. Moreover, the cutting chips that arise during the milling must be so characterized with respect to chip thickness and chip length, so that the chips can be carried away without problems via the channels of the milling tool. In order to ensure this, the parameters that are relevant for the trochoidal milling: radius of the milling tool; radius of the circular paths on which the reference point of the miller is moved; miller feed advance; cutting tooth feed of the miller; are dimensioned and maintained constant over the entire milling processing or machining, so that over the entire milling processing or machining on the one hand the permissible cutting forces are not exceeded and on the other hand the cutting chips can always be carried away well. From this, however, according to the prior art, there results a strongly varying or changing circumferential wrapping contact of the miller. From this it follows that the effectiveness of the milling processing or machining is limited in trochoidal milling known from the prior art. Disadvantages arise with respect to milling time and operating service life of the milling tool.

SUMMARY OF THE INVENTION

Starting from this point, the underlying problem on which the present invention is based, is to propose a novel milling method for the production of structural components.

According to the invention, the curvature at each path point of each path is determined such that an optimized circumferential (wrapping) contact of the milling tool is ensured for each path point. Hereby the milling time can be reduced. Moreover, the operating lifetime or the useful operating time of the milling tool is increased, because the cutting entries of the cutting edges of the milling tool for carrying out the milling processing or machining are reduced.

According to an advantageous embodiment of the invention, at the beginning or at the start of each path, the milling tool is moved into the material to be milled in such a manner, so that a path vector of the milling tool extends in a tangential direction relative to a sidewall that is to be milled of the structural component that is to be produced. The milling tool is moved into the material in this direction for so long until the maximum permissible circumferential contact of the milling tool is reached. After reaching the maximum permissible circumferential contact, the path vector of the milling tool and therewith the curvature at each path point is adjusted as a function of the tool radius of the milling tool, as a function of the desired sidewalls or depressions or recesses, and as a function of the raw part contour or a milled contour of the previously completed milling path, such that approximately the maximum permissible circumferential contact of the milling tool will be maintained in each subsequent path point of the path. Preferably, the maximum permissible circumferential contact of the milling tool is ensured in each subsequent path point of the path except for an exit region of the milling tool, in which the miller is moved out of the material to be milled.

Preferred further embodiments of the invention follow from the dependent claims and from the following description.

BRIEF DESCRIPTION OF THE DRAWINGS

An example embodiment of the invention, without being limited hereto, is explained in further detail in connection with the drawing. In the drawing.

In the following, the present invention will be explained in greater detail with reference to the FIGS. Before the details of the inventive method will be explained, however, in the following a few terms will be defined, to which reference will be made later.

DETAILED DESCRIPTION OF EXAMPLE EMBODIMENTS OF THE INVENTION

The milling machining or processing of the workpiece or the material to be machined is achieved with the aid of a tool, a so-called miller. The miller generally has a circular round cross-section with a tool radius $R_{FW}$.

During the milling, the miller is in engagement with the material. The circular arc section of the circular cross-section of the miller, which is engaged with the material, determines or defines the so-called circumferential or wrapping contact of the milling tool.

For the processing or machining of the workpiece, the tool i.e. the miller is moved relative to the workpiece i.e. the material. The motion of the tool i.e. the miller relative to the workpiece is described by so-called tool coordinates, whereby the tool coordinates define the position of a tool reference point. The motion of the tool reference point in the milling machining of the workpiece is designated as the tool path or milling path.

Beginning from a tool tip or peak or from the tool reference point, a vector extends along a tool axis or a tool shaft of the tool or miller. This vector along the tool axis beginning from the tool tip or point in the direction of the tool shaft is referred to as a tool vector.

Figure 1:
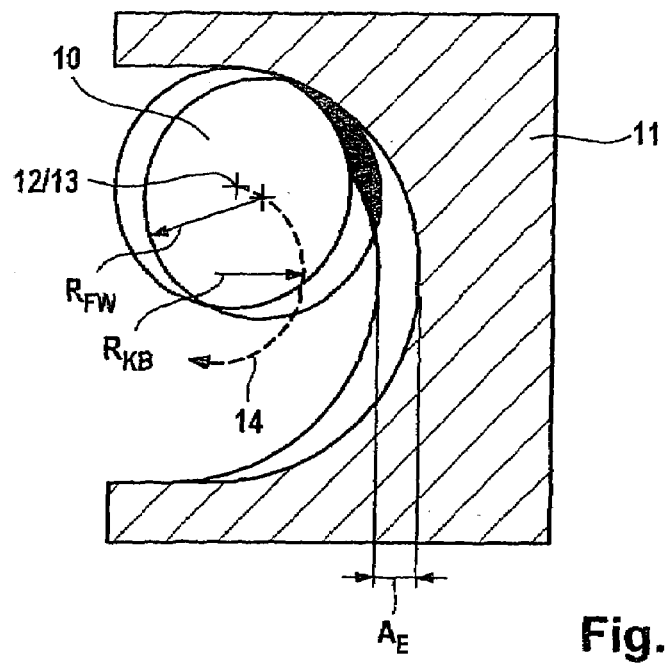
FIG. 1 shows a strongly schematized illustration for the explanation of the trochoidal milling according to the prior art.
Figure 2:
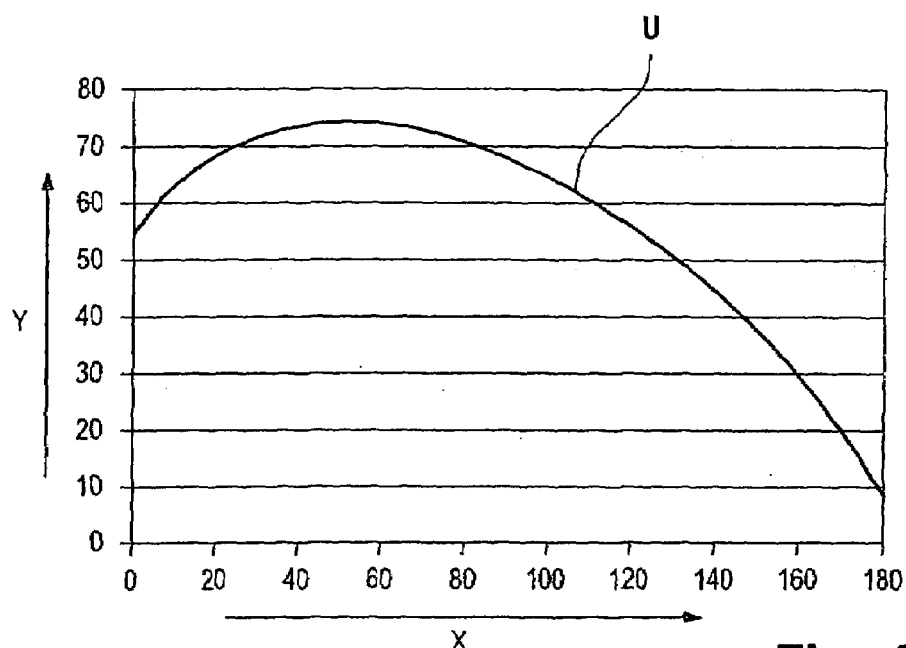
FIG. 2 shows the circumferential contact of the milling tool that occurs in the trochoidal milling according to the prior art.

FIGS. 1 to 4 clarify the relationships in conventional trochoidal milling, as it is known from the prior art. Thus, FIG. 1 shows a milling tool 10, which penetrates into a workpiece 11 that is to be machined, for the milling machining or processing of the same. The milling tool 10 is moved through the workpiece 11 in such a manner that a structural component with a desired three dimensional free-form surface results after the milling processing or machining.

According to FIG. 1, the milling tool 10 has a circular shaped cross-section with a tool radius $R_{FW}$. In the milling, in order to ensure a central rotation of the milling tool 10, the milling tool 10 is rotationally driven about an axis 12 of the milling tool 10. In the conventional trochoidal milling, according to FIG. 1 a reference point 13 of the milling tool lying on the axis 12 is moved on a circular path 14, whereby this circular path 14 has a radius $R_{KB}$. A translational feed advance motion either on a straight or curved feed advance path is superimposed on these two motions of the milling tool 10. The superposition of these three motions of the milling tool 10 results in the conventional trochoidal milling according to the prior art, whereby the milling tool 10 is moved with a radial miller feed or depth of cut $A_E$ relative to the workpiece 11.

In the trochoidal milling in the sense of the prior art, the circumferential contact of the milling tool 10, thus the section of the circular shaped cross-section of the milling tool that is in engagement with the workpiece 11 to be milled, is not constant. This can be understood especially from FIG. 2, in which the position of the milling tool 10 on the circular path with the radius $R_{KB}$ is entered along the X-axis and the circumferential contact U of the milling tool 10 is entered on the Y-axis. Thus it can be understood from FIG. 2, that the circumferential contact of the milling tool 10 strongly fluctuates depending on the position thereof on the circular path 14.

Figure 3:
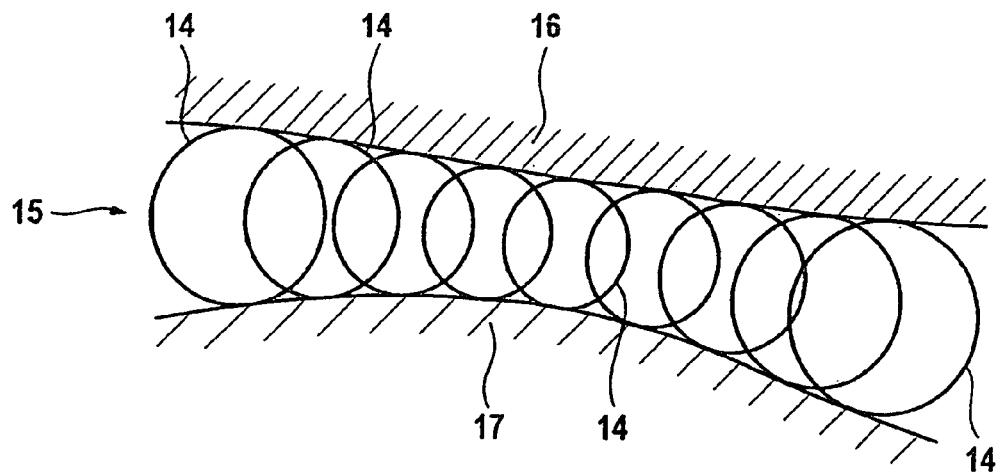
FIG. 3 shows a sharply schematized illustration of a flow channel that is bounded by two curved sidewalls and that is to be milled, with paths in the sense of the trochoidal milling according to the prior art.
Figure 4:
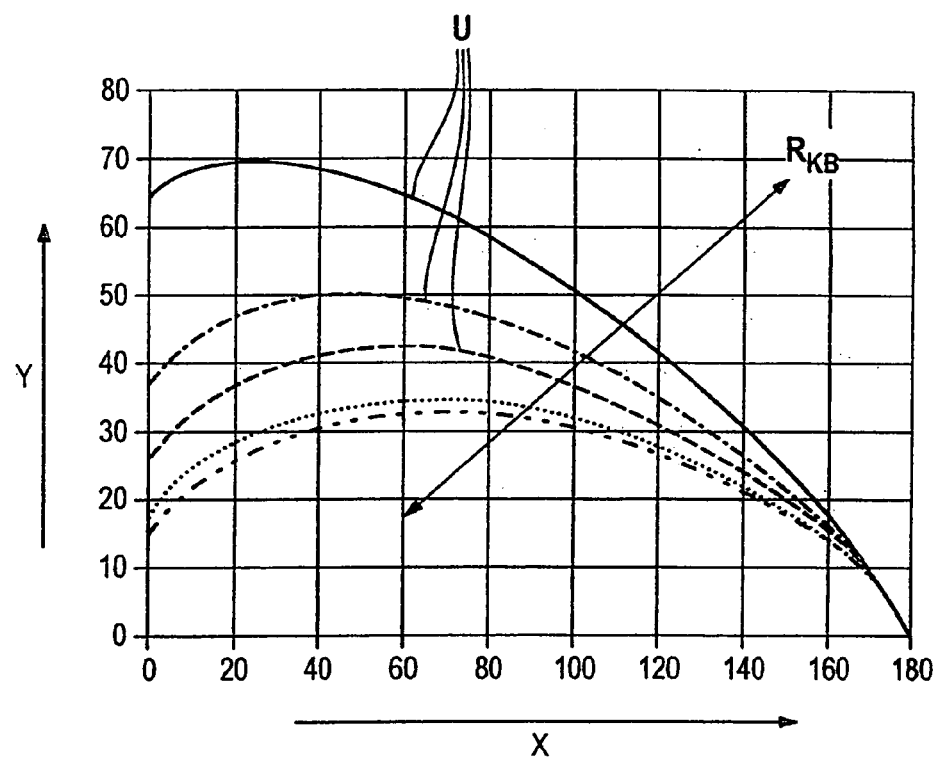
FIG. 4 shows the circumferential contact of the milling tool dependent on the milling path radius, as it occurs in the trochoidal milling according to the prior art.

If the trochoidal milling is used for the production of integral bladed rotors for gas turbines, i.e. of so-called bladed disks (blisks), thus FIG. 3 shows that a flow channel 15 that is to be machined out by means of the trochoidal milling is bounded by two sidewalls 16, 17 that extend curved and not parallel relative to one another. From this it follows directly that the radius $R_{KB}$ on which the reference point 13 of the milling tool 10 is moved, changes from circular path 14 to circular path 14. If, however, the radius $R_{KB}$ of the circular path 14 changes, this also has effects or influences on the circumferential contact U of the milling tool as shown by FIG. 4. Thus, once again in FIG. 4, the position of the milling tool 10 along the circular paths 14 is entered on the X-axis. The circumferential contact U of the milling tool 10 is again entered on the Y-axis. FIG. 4 shows the course or progression of the circumferential contact of the milling tool dependent on the position thereof on the circular paths 14 for six different radii. For radii becoming smaller, the circumferential contact of the milling tool 10 changes ever more strongly.

From the above illustrated relationships of the trochoidal milling, as it is known from the prior art, it follows directly, that a maximum permissible circumferential contact of the milling tool 10, which is given or determined in that arising cutting chips need to be surely carried away, can only be maintained at a certain radius of a path 14 and a certain position of the milling tool 10 on this path 14. At all other positions of the milling tool 10 on this path, and at all other paths with different radii, in contrast, the circumferential contact of the milling tool always lies below the maximum permissible and thus optimum circumferential contact in the trochoidal milling according to the prior art.

With the invention a milling method is proposed, in which the trochoidal milling known from the prior art is optimized in such a manner that an optimized circumferential contact of the milling tool 10 is ensured, independent of the path on which the milling tool 10 is moved and independent of the position of the milling tool 10 on the path. This will be explained in greater detail in the following with reference to FIGS. 5 and 6.

It is now in the sense of the present invention, to move the reference point of the milling tool no longer on circular paths, but rather more generally on curved paths. In that regard, the curvature at each path point of each path is determined in such a manner that an optimized circumferential contact of the milling tool is ensured for each path point. For each path point, the circumferential contact of the milling tool is optimized in the direction toward the maximum permissible circumferential contact, without exceeding the maximum permissible circumferential contact, however.

Figure 6:
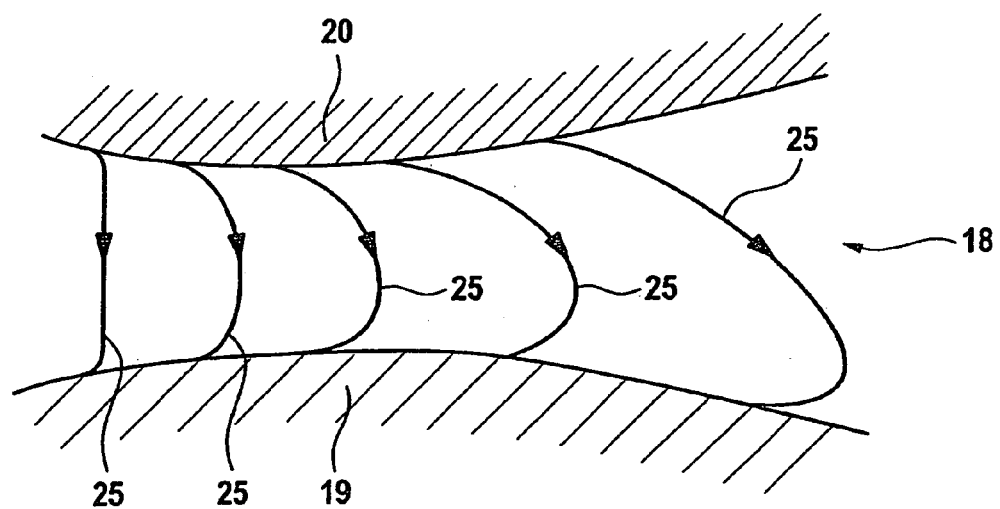
FIG. 6 shows paths that occur in the trochoidal milling according to the invention.

FIG. 6 shows a flow channel 18 that is to be milled, and that is bounded by two sidewalls 19, 20 that extend curved and not parallel to one another. At the beginning or at the start of each path, the milling tool is moved into the material to be milled in such a manner, so that a path vector of the milling tool, which determines the motion direction thereof, extends in a tangential direction to the sidewall 20 that is to be milled-out, and on which the milling process is begun. In this tangential direction, the milling tool is moved into the material so long until the maximum permissible circumferential contact of the milling tool is reached.

After reaching the maximum permissible circumferential contact of the milling tool, the path vector of the milling tool and therewith the curvature in each path point is adjusted so that preferably in each subsequent path point of the path, the maximum permissible circumferential contact of the milling tool is ensured or will be maintained. In that regard, the path vector or the curvature in each path point is determined as a function of the tool radius $R_{FW}$ of the milling tool, as a function of the contour of the sidewalls or depressions that are desired or to be milled, and as a function of the raw part contour or a milling contour of the last completed path. After reaching the maximum permissible circumferential contact of the milling tool, this can be maintained for each path point of the path, excluding the path points that lie at the end of the curved extending paths and along which the milling tool is moved out of the material to be milled or the workpiece to be machined.

Figure 5:
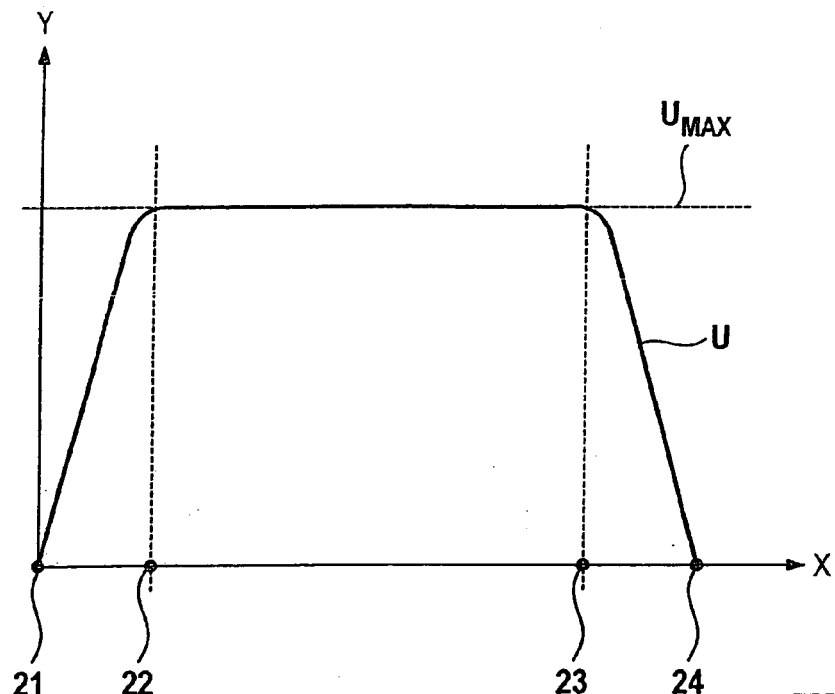
FIG. 5 shows a circumferential contact of the milling tool that occurs in the trochoidal milling according to the invention.

Thus, in a diagram, FIG. 5 shows the circumferential contact that is to be achieved by means of the inventive method. The position of the milling tool 10 along the path is entered on the X-axis. The circumferential contact U of the milling tool 10 is entered on the Y-axis. At the beginning of each path, which is illustrated by the point 21, the milling tool 10 comes into contact with the workpiece to be machined, whereby at this point 21 therefore the circumferential contact of the milling tool just still amounts to zero. In this point, the milling tool lies in the tangential direction in contact on the sidewall 20 that is to be milled-out. The milling tool is moved into the material or the workpiece in this tangential direction so long until the maximum permissible circumferential contact $U_{MAX}$ is reached. This corresponds to the point 22 in FIG. 5. After reaching the maximum permissible circumferential contact $U_{MAX}$ in the point 22, the curvature in each further path point is adjusted so that the circumferential contact of the milling tool in each further path point corresponds to the maximum permissible circumferential contact. Only at the end of the curved extending path, at which the milling tool must be moved out of the workpiece, and namely in the tangential direction to the other sidewall, the circumferential contact is no longer held to the maximum permissible value thereof, but rather is successively reduced to zero during the moving-out of the milling tool out of the material. This last path section, which serves for moving-out the milling tool out of the workpiece, lies between the points 23 and 24.

FIG. 6 visualizes the curvature progression of several paths 25, which can result or arise through the use of the inventive method. The curvature progression naturally also depends strongly on the contours of the sidewalls that are to be milled-out and therewith on the contour of the flow channel that is to be milled-out.

At this point it is again mentioned that naturally also a central rotation of the milling tool about its tool axis occurs in the inventive optimized trochoidal milling during the motion of the tool reference point on the curved paths. The motion of the milling tool along the curved paths 25 and the central rotation thereof are preferably carried out in opposite rotational directions. This then results in a tool-protecting as well as a workpiece-protecting down-cut milling.

Moreover, these two motions are superimposed with a translational feed advance motion of the tool reference point. As in the conventional trochoidal milling according to the prior art, thus also in the optimized trochoidal milling, three motions are superimposed, namely on the one hand the central rotation of the milling tool about its axis, the motion of the reference point of the milling tool along the curved path, and the feed advance motion of the tool reference point. In contrast however, in the sense of the invention, the curvature in each path point of the paths is optimized such that for each path point an optimized circumferential contact of the milling tool is ensured.

Necessitated by the fact that thereby the circumferential contact of the milling tool corresponds to the maximum permissible circumferential contact in nearly every path point, the maximum possible cutting chip volume is always or constantly removed and carried away. Thereby, in the sense of the invention, the required milling time can be considerably reduced by means of the optimized trochoidal milling. Moreover, the optimized trochoidal milling method has a positive effect on the operating service life of the milling tool. Namely, the operating service life of the milling tool is also determined by the number of the cutting entries or bites of the cutting edge into the material. Since the circumferential contact of the milling tool is optimized in the direction toward the maximum permissible circumferential contact in each path point in the inventive milling method, thereby also the number of the necessary cutting edge cutting entries or bites into the material is also reduced. Thereby the operating service life of the milling tools can also be increased. The inventive milling method can especially be utilized for the production of integral bladed rotors for gas turbines, so-called bladed disks (blisks) or bladed rings (blings). It is, however, also suitable for the milling machining of so-called scallops.

It is further within the sense of the inventive milling method, to superimpose a fourth motion component on the above described three motion components.

Thus, a swinging or pivoting motion of the axis of the milling tool, for producing a tumbling or wobbling motion with a variable tilt of the axis, can additionally be superimposed on the motion of the tool reference point along the curved paths, the central rotation of the milling tool about its axis, and the translational feed advance motion of the reference point of the milling tool. This serves for the optimum fitting or close contact of the milling tool to non-vertical sidewalls. For this purpose, the axis of the milling tool can be periodically pivoted in the sense of a wobbling motion about a defined axis point in the area of a miller tip or peak of the milling tool, whereby the axis temporarily stands parallel to tangents of the sidewalls that are to be milled.

The invention claimed is:

1. Milling method for the production of a structural component from a material, while producing a depression with at least one sidewall, whereby a milling tool having a tool radius is rotationally driven about an axis of the milling tool to carry out a central rotation thereof, whereby a reference point of the milling tool lying on an axis of the milling tool is moved on several curved paths, whereby the paths respectively comprise different curvatures, and whereby the milling tool is moved with a radial miller feed relative to the material on the paths, characterized in that, after reaching a maximum permissible circumferential contact of the milling tool with the material, the curvature at each path point of each path is determined dependent on the tool radius of the milling tool, the depression to be milled, and a milling contour of an immediately previously followed one of the paths, in such a manner so that at each path point the circumferential contact of the milling tool with the material is optimized to the maximum permissible circumferential contact.

2. Method according to claim 1, characterized in that the curvature at each path point of each path is determined in such a manner that for each path point the maximum permissible circumferential contact of the milling tool with the material is not exceeded.

3. Method according to claim 1, characterized in that at a beginning of each path, the milling tool is moved into the material to be milled in such a manner, so that a path vector of the milling tool extends in a tangential direction tangent to the sidewall of the depression that is to be milled-out, and that the milling tool is moved into the material in the tangential direction so long until the maximum permissible circumferential contact of the milling tool with the material is reached.

4. Method according to claim 3, characterized in that, after reaching the maximum permissible circumferential contact, the path vector of the milling tool is adjusted so that at each subsequent path point in a main milling portion of the path the maximum permissible circumferential contact of the milling tool is maintained.

5. Method according to claim 4, characterized in that the maximum permissible circumferential contact of the milling tool is maintained at each subsequent path point of the path up to and except for an exit region of the milling tool out of the material.

6. Method according to claim 1, characterized in that a translational feed advance motion of the reference point of the milling tool providing the radial miller feed is superimposed on a motion of the reference point of the milling tool along the curved paths and the central rotation of the milling tool about the axis.

7. Method according to claim 6, characterized in that the translational feed advance motion of the reference point of the milling tool occurs on a straight and/or curved feed advance path.

8. Method according to claim 6, characterized in that a pivoting motion of the axis of the milling tool for producing a wobbling motion with a variable tilt of the axis is superimposed on the motion of the reference point of the milling tool along the curved paths, the central rotation of the milling tool about the axis, and the translational feed advance motion of the reference point of the milling tool.

9. Method according to claim 8, characterized in that for superimposing the pivoting motion, the axis of the milling tool is periodically pivoted about a point in the area of a miller tip of the milling tool.

10. Method according to claim 1, characterized in that the motion of the milling tool along the curved paths and the central rotation thereof are carried out respectively with opposite rotation directions.

11. A method of milling a material to produce a milled structural component, said method comprising the steps:
 a) rotating a milling tool about a tool axis of the milling tool; and
 b) while the milling tool is rotating, advancing the milling tool successively along plural successive milling paths in the material so as to mill a depression into the material by cutting chips from the material with the milling tool;

wherein:
 each one of the successive milling paths respectively has a respective beginning portion, a respective curved main milling portion, and a respective exit portion in succession,
 the respective curved main milling portions of the successive milling paths respectively have different curvatures relative to one another,
 in the beginning portion of each respective one of the milling paths, the milling tool is advanced into the material beginning from a zero value of a circumferential contact between the milling tool and the material, up to a maximum value of the circumferential contact,
 in the main milling portion of each respective one of the milling paths, the respective curvature thereof is determined so that the milling tool is advanced along the respective main milling portion while maintaining the maximum value of the circumferential contact between the milling tool and the material, and
 in the exit portion of each respective one of the milling paths, the milling tool is withdrawn from the material while reducing the circumferential contact between the milling tool and the material from the maximum value to the zero value.

12. The method according to claim 11, further comprising predetermining the maximum value of the circumferential contact as a greatest value of the circumferential contact for which the chips cut from the material are surely removed from the depression.

13. The method according to claim 11, comprising determining the respective curvature of the main milling portion of each respective one of the milling paths dependent on a tool radius of the milling tool, a contour of the depression, and the curvature of the main milling portion of an immediately preceding one of the milling paths along which the milling tool advanced immediately preceding the respective one of the milling paths.

* * * * *